May 19, 1970  R. F. PEARSON ET AL  3,512,867
MAGNETO-OPTICAL DIGITAL LIGHT DEFLECTION DEVICE
Filed May 18, 1967  3 Sheets-Sheet 3

INVENTORS
RONALD F. PEARSON
ROGER W. COOPER
BY
AGENT

United States Patent Office 3,512,867
Patented May 19, 1970

---

3,512,867
MAGNETO-OPTICAL DIGITAL LIGHT DEFLECTION DEVICE
Ronald Ferguson Pearson, Reigate, and Roger William Cooper, Sevenoaks, England, assignors, by mesne assignments, to U.S. Philips Corporation, New York, N.Y., a corporation of Delaware
Filed May 18, 1967, Ser. No. 639,572
Int. Cl. G02f 3/00, 1/22
U.S. Cl. 350—151                                5 Claims

ABSTRACT OF THE DISCLOSURE

A magneto-optical switch is described, in which a beam of polarized infra-red radiation is directed through a block of YIG magnetized to rotate the plane of polarization of the beam by 45 degrees. The magnetic field is reversible. In one arrangement, a second magnetized YIG block is also arranged in the path of the beam to rotate the polarization by 45 degrees. In another arrangement, the rotated beam is directed to a birefringent prism having an optical axis normal to the beam such that the beam is deflected.

---

This invention relates to magneto-optical devices and is based upon investigations into the optical properties of high-purity single crystals of yttrium-iron-garnet, hereinafter referred to as YIG. This material is nearly opaque in the visible spectrum but investigations have shown that for a band in the infra-red region it becomes transparent, and further that within the band a single crystal of YIG can be made to exhibit the phenomenon of Faraday rotation.

The present invention is directed towards the technique of providing a two-position, that is to say a binary, beam system which depends for its operation upon the Faraday-rotation effect of YIG.

According to the present invention a binary deflection unit operable to deflect a beam of infra-red energy comprises a Faraday-rotation device in the form of a single-crystal block of yttrium-iron-garnet, means providing a linear path extending through the block for infra-red energy, means for applying to the block a magnetic field extending through the block in a direction parallel to the said path, a birefringent prism placed in the path of the beam emerging from the block, a plane surface onto which the beam emerging from the prism can impinge, and means for reversing the direction of the magnetic field so as to alter the position on the plane surface at which the beam impinges.

If desired a lens may be provided for focusing onto the plane surface the beam of energy emerging from the prism.

An embodiment of the invention will now be described with reference to the accompanying diagrammatic drawings in which.

In experiments leading to the present invention magneto-optic studies were made on very thin samples, about $50\mu$ thick which are transparent for visible as well as infra-red wavelengths. Direct visual observation of the magnetisation or domain structure in these samples was possible utilising the Faraday effect. Thus when a sample was placed between a polariser and analyser, the plane of polarisation of light incident on the crystal was found to be rotated by regions possessing a magnetisation component along the light beam direction, consequently producing a change in intensity of light transmitted by the analyser.

Figure 1:
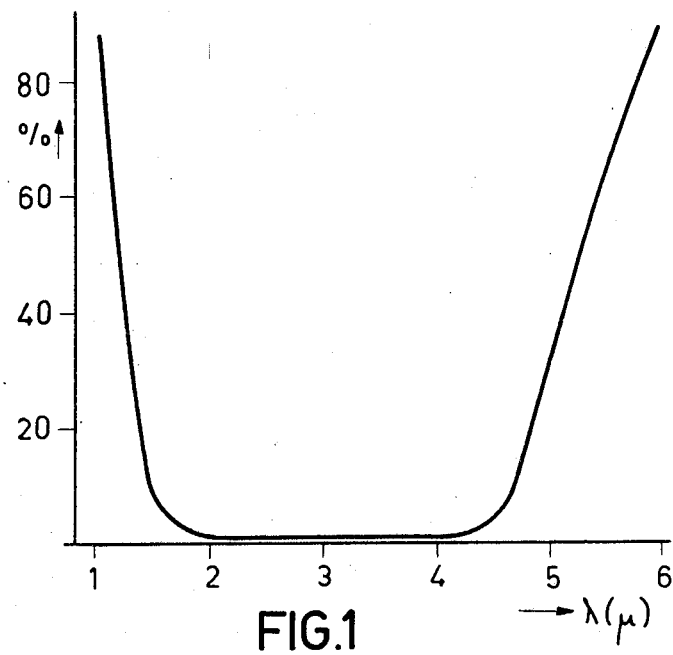
FIG. 1 illustrates the absorption/wavelength characteristic of YIG.

When an external magnetic field was applied to magnetise the sample to saturation in a direction parallel to the path of the light beam it was found that Faraday rotation varied from $1200°/cm$. at $0.6\mu$ to $60°/cm$. at $5\mu$. However, to make a useful device the Faraday rotation needs to be accompanied by low optical absorption and further experiments yielded graphs of the form shown in FIG. 1 in which is plotted the optical absorption associated with a length of material which will give $45°$ rotation. It will be seen that $45°$ rotation can be obtained with very low loss in the region $1.2$ to $5\mu$. The transparent region can be extended slightly toward the visible to include the Nd laser line at $1.06\mu$, by cooling the material to $80°$ K.

Figure 2:
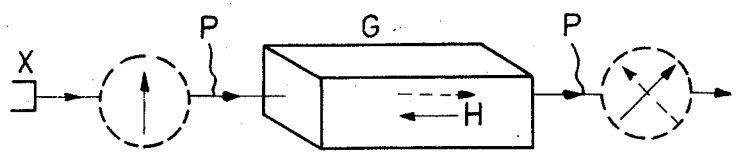
FIGS. 2 and 3 illustrate magneto-optical properties of YIG.
Figure 3:
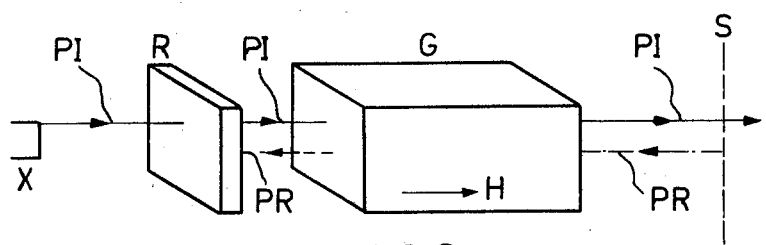

In further experiments leading to the present invention and illustrated in FIGS. 2 and 3, a single-crystal block of YIG was used as a light-polarisation switch. A polished block G of YIG was cut to such a length that reversal of magnetisation in the block resulted in a $90°$ rotation of the plane of polarisation of the emergent beam is illustrated in FIG. 2. In the figure the full line arrows pertaining to the magnetic field H and the emergent beam correspond to each other whilst the broken line arrow indicating polarisation of the emergent beam corresponds to the direction of magnetic field H indicated also in broken lines. An apparatus having such a block combined with a polariser R is illustrated in FIG. 3: this arrangement provides the optical analogue of the microwave isolator, since the rotation is non-reciprocal, that is to say when the block is saturated magnetically by a field H in a direction parallel to the path PI of a beam of light passing from a source X through the block, for a fixed direction of magnetisation of the block, any reflected beam PR is rotated a further $45°$ in the same direction by the block, arriving back at the polariser rotated by $90°$ and thus not transmitted back to the source. In FIG. 3 the path of the incident beam PI and the path of the reflected beam PR are for convenience shown spaced apart so as readily to be identifiable but in practice of course they will follow the same path. With this arrangement any reflection from a further element in an equipment, such as a mirror or other partly reflecting surface S, or from a plane surface of the end of the block itself, is not transmitted back to the source X.

Figure 4:
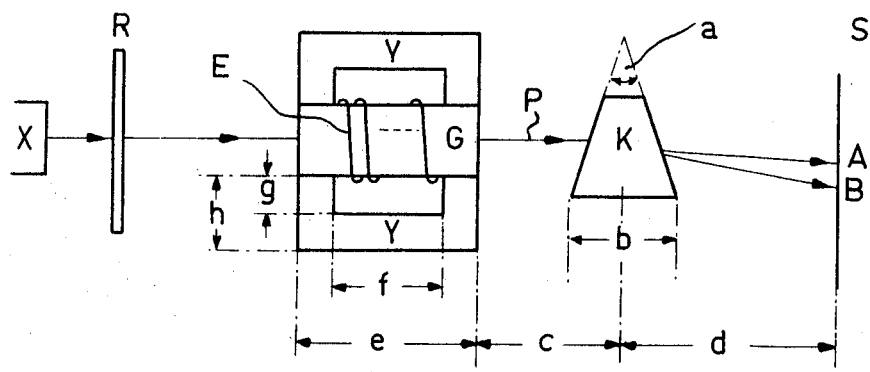
FIGS. 4, 5, 6 and 7 illustrates embodiments of the invention.

In the embodiment of the invention illustrated in FIG. 4 a prism K was made from a birefringent crystal of rutile with the refracting edge parallel to the optic axis, so that the deviation of a light beam F by the prism was dependent upon its polarisation relative to the optic axis. A YIG block G of such length as to give a $45°$ rotation was magnetised by a coil E and the magnetic circuit was completed by two yoke members Y of ferrite material. In the path of the beam emerging from the prism K was placed a surface S. This arrangement formed a 2-position beam-deflector in which the position of the light spot on the surface S could be switched from position A to position B by reversal of magnetisation in the YIG block G, this reversal being accomplished by reversing the current through the coil E so as to provide two paths PA and PB respectively for light emerging from the prism K.

The YIG block G and prism K thus comprise a binary deflection unit U; a succession of N such units will give a one-dimensional digital deviation bank, with $2^N$ displacement positions, if the prism angles are so arranged that each successive prism gives twice the deviation. A two dimensional array may be obtained with a second orthogonal bank in series with the first: such an electronically controlled digital deviation bank has applications in optical radar, a high resolution radar for use in outer space, in computer systems, character recognition, micro-circuit fabrication and high speed printing.

In the experimental embodiment described above with reference to FIG. 4 the source X was a helium-neon gas laser operated so as to produce an infra-red beam having a wavelength of 3.39 microns. The laser beam was plane-polarised but the polariser R was included to allow small rotations of the plane of polarisation to facilitate setting-up the device: this polariser consisted of a calcite plate 1 cm. square and 5 mm. thick the optic axis lying in the plane of the plate.

Figure 5:
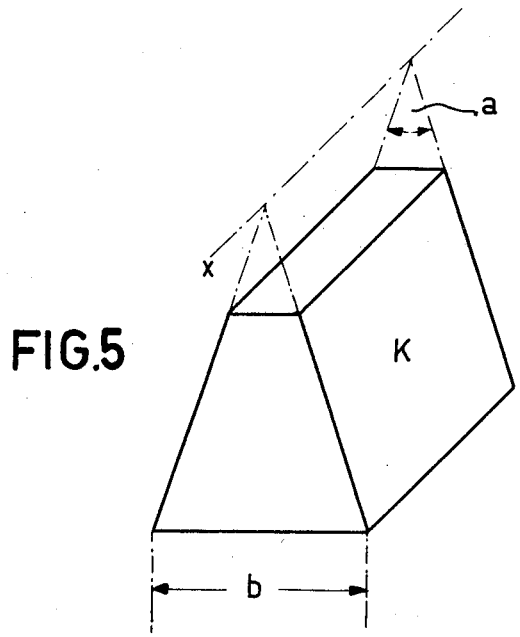

The prism K was made from single-crystal rutile ($TiO_2$) the refracting edge being parallel to the optic axis, $x$ in FIG. 5, of the crystal. The base of prism, dimension $b$ in FIGS. 4 and 5, measured 2.4 mm. and the prism angle $a$ was 3½ degrees. The distance between the Faraday rotation device and the centre line of the prism K, dimension $c$ in FIG. 4, was 8 cm. and the distance $d$ between that centre line and the screen S was 18 cm. Photosensitive detectors were positioned one at each point A and B.

The yoke members Y were cut from polycrystalline YIG material. Without special efforts being made to grind the surfaces flat to minimise air gaps in the assembly it was found that 25 ampere turns (½ amp 50 turns) were sufficient to saturate the sample magnetically. The members Y were identical and each was 3 mm. thick, the other dimensions, indicated in FIG. 4 being $e=6$ mm., $f=3$ mm., $g=2.5$ mm. and $h=4$ mm. The block G was 6 mm. long and of square cross-section having sides of 3 mm.

At the positions A and B the separation of the two beams was 2.8 mm. corresponding to an angular deflection of 52′ (minutes) of arc: for small angles the angular deflection is directly proportional to the prism angle $a$. Measurements indicated that 20% of the intensity of the incident light beam was lost due to reflection at the YIG surfaces and a further 33% was lost at the prism surfaces due to the high refractive indices of these materials (YIG 2.2, rutile 2.4 to 2.6). These losses could be substantially reduced by using anti-reflection coatings.

The present invention is further directed towards the use of a single-crystal block of YIG as an electronic active Q-switching element for an infra-red laser. Q switches are employed to obtain a high power pulsed output from a laser. The Q of the laser cavity is reduced whilst population inversion of "lasing" ions builds up; when population inversion has reached a maximum the source of loss or low Q is removed quickly, an intense pulse of laser radiation is then emitted.

Figure 6:
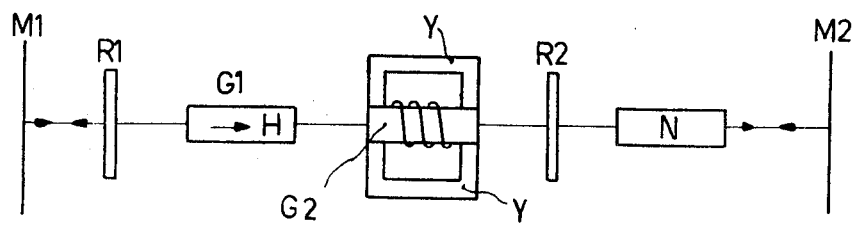

One experimental embodiment of a Q-switching scheme employing this technique is illustrated in FIG. 6. This employs two 45° blocks, of which G1 is permanently magnetised along the path of the light beam; the other block G2 is equipped with a switching coil and magnetic circuit members Y. These blocks are placed between crossed polarisers R1 and R2 in the laser cavity which also contains a laser rod N and two mirrors M1 and M2 which define the ends of the light-path. If block G2 is magnetised in the same direction as block G1 the combination permits loss-free transmission; if however the magnetisation of block G2 is switched so as to be in the opposite direction from that of block G1 the beam is absorbed in the second polariser.

In the experimental embodiment described above with reference to FIG. 6 the laser N was a helium-neon gas laser producing an infra-red beam at a wavelength of 3.39 microns. The polarisers R were each a calcite plate 5 mm. thick with the optic axis lying in the plane of the plate; such a plate is operative in bands centred at 3.45 microns and 4.0 microns.

Figure 7:
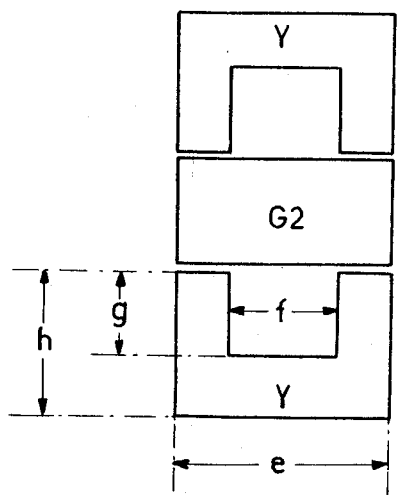

The yoke members Y were cut from polycrystalline YIG material. Without special efforts being made to grind the surfaces flat to minimise air gaps in the assembly it was found that 25 ampere turns (½ amp 50 turns) were sufficient to saturate the sample magnetically. The members Y were identical and each was 3 mm. thick, the other dimensions, indicated in FIG. 7 being $e=6$ mm., $f=3$ mm., $g=2.5$ mm. and $h=4$ mm. Each block G1 and G2 was 6 mm. long and 3 mm. square cross-section. Of course, shorter blocks could be used for shorter wavelengths since the Faraday rotation increases to 200°/cm. at 1.2$\mu$. The block G1 was magnetised using a permanent magnet; the field required was found to depend upon the actual shape of the block but it was found that 2000 oersted was the maximum required. Alternatively it could be magnetised by means of a coil and yoke assembly in a similar manner to block G2.

What is claimed is:

1. A system for controlling a polarized radiation beam derived from a source and directed along an optical path comprising means in said path for magneto-optical rotating the plane of polarization of said beam by 45 degrees including a yttrium-iron-garnet body having an end proximate said source and an end remote from said source, and means for applying a reversible magnetic field in parallel with the path of said beam in said body; and means for deflecting said beam to one of two positions in accordance with the direction of said magnetic field including a birefringent prism located within said beam path and proximate the remote end of said body, said prism having an optical axis positioned at right angles to said beam.

2. A system as claimed in claim 1 wherein said applying means comprises a coil wound about said body and a magnetic yoke magnetically coupled to the ends of said body.

3. A system as claimed in claim 2 wherein said yoke comprises yttrium-iron-garnet.

4. A system as claimed in claim 1 wherein said prism comprises rutile.

5. A system as claimed in claim 1 wherein said prism has a cross-sectional shape of a truncated triangle.

References Cited

UNITED STATES PATENTS

| | | | |
|---|---|---|---|
| 2,030,235 | 2/1936 | Walton | 350—151 |
| 2,974,568 | 3/1961 | Dillon | 350—151 |
| 3,220,013 | 11/1965 | Harris | 350—150 |
| 3,272,988 | 9/1966 | Bloom et al. | 350—151 X |

OTHER REFERENCES

Porter et al., "Transparent Ferromagnetic Light Modulator Using Yttrium Iron Garnet," J. App. Phys., vol. 29, No. 3. (March 1958) pp. 495–496.

Smith, "Electro-Optic Deflection Device," IBM Tech. Disc. Bull., vol. 6, No. 12 (May 1964) pp. 52–53.

Zitter et al., "Infrared and Visible Laser and Modulation Using Faraday Rotation in YIG," J. App. Phys., vol. 37, No. 3 (March 1966) pp. 1089–1090.

DAVID SCHONBERG, Primary Examiner

P. R. MILLER, Assistant Examiner

U.S. Cl. X.R.

250—199; 350—1, 150, 160